US012579824B2

(12) United States Patent
Kito et al.

(10) Patent No.: US 12,579,824 B2
(45) Date of Patent: Mar. 17, 2026

(54) OCCUPANT DETECTION DEVICE AND OCCUPANT DETECTION METHOD

(71) Applicant: AISIN CORPORATION, Kariya (JP)

(72) Inventors: Kosuke Kito, Kariya (JP); Ryohei Fuwa, Kariya (JP); Takayuki Nakagome, Kariya (JP); Asami Yamazaki, Kariya (JP)

(73) Assignee: AISIN CORPORATION, Kariya (JP)

( * ) Notice: Subject to any disclaimer, the term of this patent is extended or adjusted under 35 U.S.C. 154(b) by 245 days.

(21) Appl. No.: 18/350,801

(22) Filed: Jul. 12, 2023

(65) Prior Publication Data

US 2024/0071106 A1 Feb. 29, 2024

(30) Foreign Application Priority Data

Aug. 29, 2022 (JP) ................................. 2022-135824

(51) Int. Cl.
*G06V 20/59* (2022.01)
*G06T 7/73* (2017.01)

(52) U.S. Cl.
CPC .............. *G06V 20/593* (2022.01); *G06T 7/73* (2017.01); *G06T 2207/10028* (2013.01); *G06T 2207/30268* (2013.01)

(58) Field of Classification Search
CPC ...... G06V 20/593; G06V 40/103; G06T 7/73; G06T 2207/10028; G06T 2207/30268;
(Continued)

(56) References Cited

U.S. PATENT DOCUMENTS

2020/0290541 A1* 9/2020 Mitani .................. G06V 20/593
2023/0030426 A1* 2/2023 Glazman ............... B60R 21/015
(Continued)

FOREIGN PATENT DOCUMENTS

| JP | 2017-149346 A | 8/2017 |
| JP | 2020-527230 A | 9/2020 |
| JP | 2021-189011 A | 12/2021 |

OTHER PUBLICATIONS

Extended European Search Report issued Jan. 23, 2024 in European Patent Application No. 23186095.8, 7 pages.

*Primary Examiner* — Jennifer Mehmood
*Assistant Examiner* — Vaisali Rao Koppolu
(74) *Attorney, Agent, or Firm* — Oblon, McClelland, Maier & Neustadt, L.L.P.

(57) ABSTRACT

An occupant detection device includes: an acquisition unit configured to acquire, based on an intensity of a reflected wave generated when a transmission wave transmitted toward an interior of a moving body is reflected by an object present in the interior, point cloud information indicating a three-dimensional-coordinate position of the object moving in the interior as a point cloud including a plurality of detection points; a generation unit configured to generate, based on the point cloud information, a seat row map for each seat row including a plurality of seating regions, the seat row map indicating a distribution of the detection points in a plane region corresponding to an arrangement direction of the plurality of seating regions and a height direction of the moving body; a setting unit configured to set, on the seat row map, an upper end line along an upper end portion of a plane point cloud including two or more of the detection points; and an estimation unit configured to estimate the number of occupants for each seat row based on a shape feature of the upper end line.

13 Claims, 4 Drawing Sheets

(58) Field of Classification Search
CPC ........ B60R 21/01534; B60R 21/01542; B60R
16/0231; B60R 11/00; B60R 2011/0028;
B60W 2040/0881; G01S 7/41; G01S
13/04; G01S 13/06; G01S 13/89; G01S
5/16
See application file for complete search history.

(56) References Cited

U.S. PATENT DOCUMENTS

| | | | | |
|---|---|---|---|---|
| 2023/0168364 A1* | 6/2023 | Podkamien | ........... | G01S 13/582 |
| | | | | 701/45 |
| 2023/0219578 A1* | 7/2023 | Lin | ..................... | G06V 20/593 |
| | | | | 701/1 |
| 2024/0012100 A1* | 1/2024 | Hoshihara | ........... | G01S 13/4454 |

* cited by examiner

OCCUPANT DETECTION DEVICE 1

ACQUISITION UNIT ~101

↓ POINT CLOUD INFORMATION

GENERATION UNIT ~102

↓ SEAT ROW MAP

SETTING UNIT ~103

↓ UPPER END LINE

ESTIMATION UNIT ~104

↓

OCCUPANT INFORMATION

FIG. 7

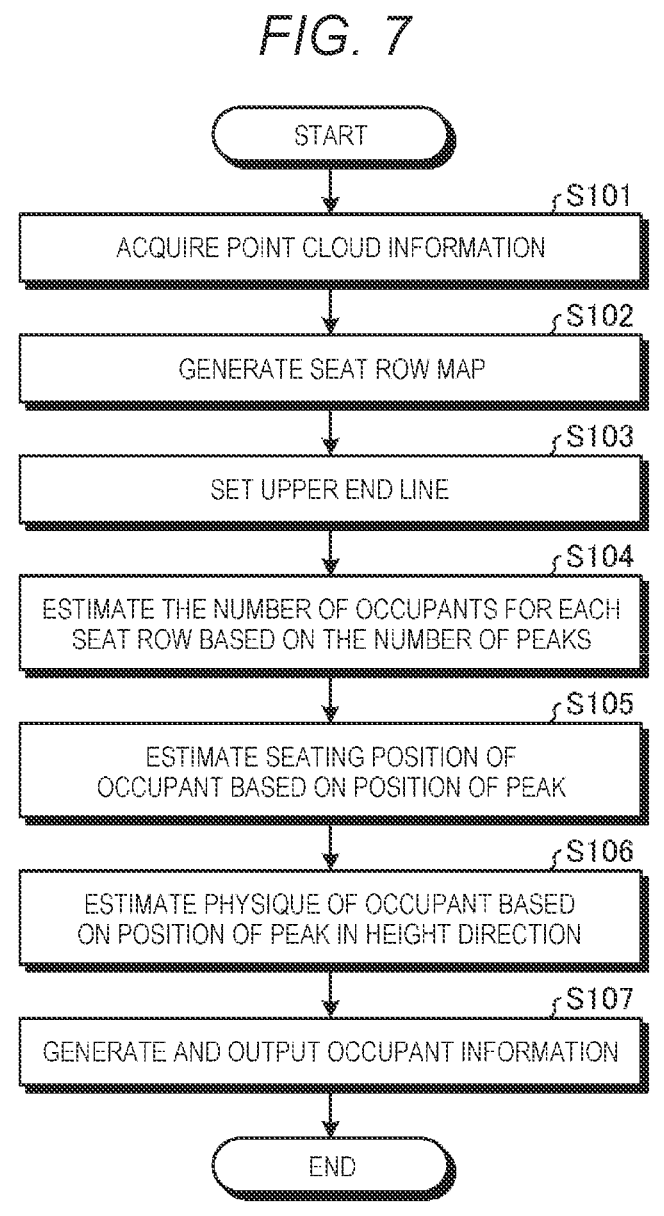

START

S101

ACQUIRE POINT CLOUD INFORMATION

S102

GENERATE SEAT ROW MAP

S103

SET UPPER END LINE

S104

ESTIMATE THE NUMBER OF OCCUPANTS FOR EACH
SEAT ROW BASED ON THE NUMBER OF PEAKS

S105

ESTIMATE SEATING POSITION OF
OCCUPANT BASED ON POSITION OF PEAK

S106

ESTIMATE PHYSIQUE OF OCCUPANT BASED
ON POSITION OF PEAK IN HEIGHT DIRECTION

S107

GENERATE AND OUTPUT OCCUPANT INFORMATION

END

OCCUPANT DETECTION DEVICE AND OCCUPANT DETECTION METHOD

CROSS REFERENCE TO RELATED APPLICATIONS

This application is based on and claims priority under 35 U.S.C. § 119 to Japanese Patent Application 2022-135824, filed on Aug. 29, 2022, the entire content of which is incorporated herein by reference.

TECHNICAL FIELD

This disclosure relates to an occupant detection device and an occupant detection method.

BACKGROUND DISCUSSION

In a vehicle control system or the like, a device that detects an occupant present in a vehicle interior is used. For such a device, a technique of detecting the number of occupants or the like based on data acquired by an electromagnetic wave sensor installed in a vehicle interior and transmitting and receiving electromagnetic waves, and a seating sensor installed in each seat is used.

Examples of the related art include JP 2021-189011A.

However, according to the technique in related art as described above, when the occupant is not seated at a regular seating position, the occupant may not be accurately detected.

A need thus exists for an occupant detection device and an occupant detection method which are not susceptible to the drawback mentioned above.

SUMMARY

According to an aspect of this disclosure, an occupant detection device includes: an acquisition unit configured to acquire, based on an intensity of a reflected wave generated when a transmission wave transmitted toward an interior of a moving body is reflected by an object present in the interior, point cloud information indicating a three-dimensional-coordinate position of the object moving in the interior as a point cloud including a plurality of detection points; a generation unit configured to generate, based on the point cloud information, a seat row map for each seat row including a plurality of seating regions, the seat row map indicating a distribution of the detection points in a plane region corresponding to an arrangement direction of the plurality of seating regions and a height direction of the moving body; a setting unit configured to set, on the seat row map, an upper end line along an upper end portion of a plane point cloud including two or more of the detection points; and an estimation unit configured to estimate the number of occupants for each seat row based on a shape feature of the upper end line.

According to another aspect of this disclosure, an occupant detection method includes: acquiring, based on an intensity of a reflected wave generated when a transmission wave transmitted toward an interior of a moving body is reflected by an object present in the interior, point cloud information indicating a three-dimensional-coordinate position of the object moving in the interior as a point cloud including a plurality of detection points; generating, based on the point cloud information, a seat row map for each seat row including a plurality of seating regions, the seat row map indicating a distribution of the detection points in a plane region corresponding to an arrangement direction of the plurality of seating regions and a height direction of the moving body; setting an upper end line along an upper end portion of a plane point cloud including a plurality of the detection points on the seat row map; and estimating the number of occupants for each seat row based on a shape feature of the upper end line.

BRIEF DESCRIPTION OF THE DRAWINGS

The foregoing and additional features and characteristics of this disclosure will become more apparent from the following detailed description considered with the reference to the accompanying drawings, wherein:

FIG. 7 is a flowchart showing an example of a process performed by the occupant detection device according to the embodiment.

DETAILED DESCRIPTION

Hereinafter, an exemplary embodiment disclosed here will be disclosed. Configurations of the embodiment described below, and operations, results, and effects provided by the configurations are examples. This disclosure can be implemented by configurations other than those disclosed in the following embodiment, and at least one of various effects based on a basic configuration and derivative effects can be obtained.

Figure 1:
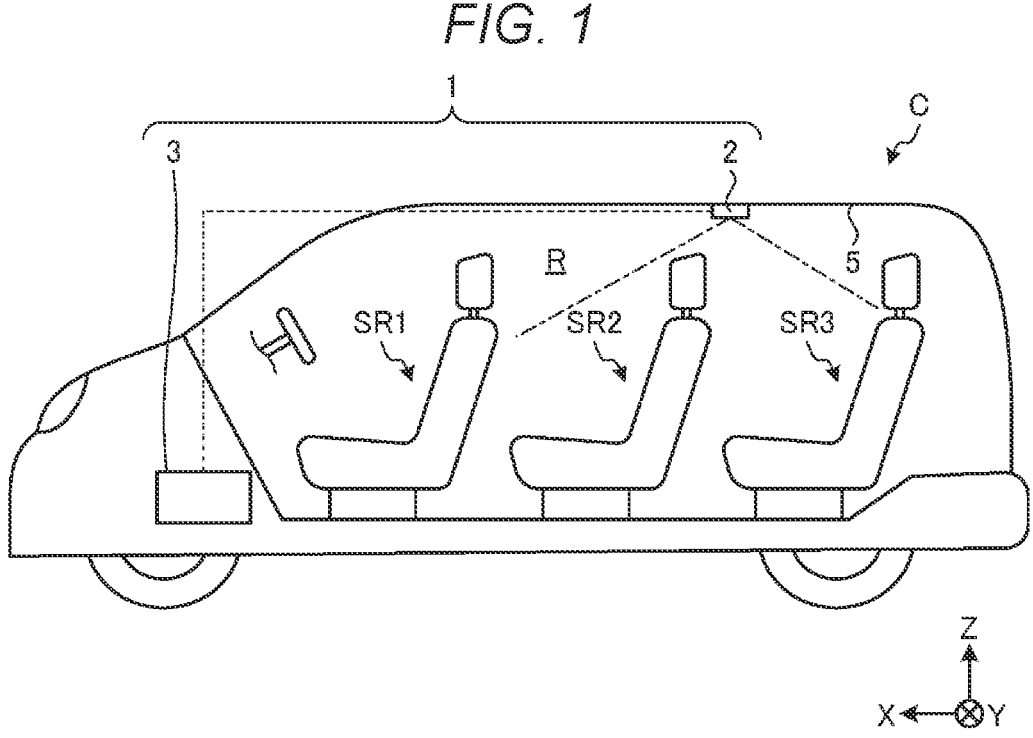
FIG. 1 is a side view showing an example of a configuration of a vehicle interior of a vehicle on which an occupant detection device according to an embodiment is mounted.

FIG. 1 is a side view showing an example of a configuration of a vehicle interior R of a vehicle C in which an occupant detection device 1 according to the embodiment is mounted. In the drawing, an X direction corresponds to a direction from a rear portion to a front portion of the vehicle C, a Y direction corresponds to a direction from a left side surface to a right side surface of the vehicle C, and a Z direction corresponds to a direction from a lower portion to an upper portion of the vehicle C.

The vehicle C is an example of a moving body, and may be, for example, an automatic vehicle using an internal combustion engine, a motor, or both the internal combustion engine and the motor (a hybrid mechanism) as a drive source. The vehicle C according to the present embodiment is a so-called three-row seat vehicle, and includes a first seat row SR1, a second seat row SR2, and a third seat row SR3. The first seat row SR1 includes a driver seat and a passenger seat.

The occupant detection device 1 is a device that detects an occupant present in the vehicle interior R. In the present embodiment, the occupant detection device 1 that detects an occupant present behind the first seat row SR1, that is, present in the second seat row SR2 and the third seat row SR3 will be described.

The occupant detection device 1 includes a sensor 2 and an information processing device 3. The sensor 2 is installed on a ceiling 5 of the vehicle C, and transmits a transmission wave toward the vehicle interior R and receives a reflected wave generated when the transmission wave is reflected by an object in the vehicle interior R. The sensor 2 according to the present embodiment is installed behind a backrest part of the first seat row SR1, and is located substantially above a backrest part of the second seat row SR2 in the example shown in FIG. 1. The information processing device 3 is installed in a dashboard and is connected to the sensor 2 via a network such as a controller area network (CAN). The installation positions of the sensor 2 and the information processing device 3 are not limited to the above examples. A plurality of sensors 2 may be provided.

Figure 2:
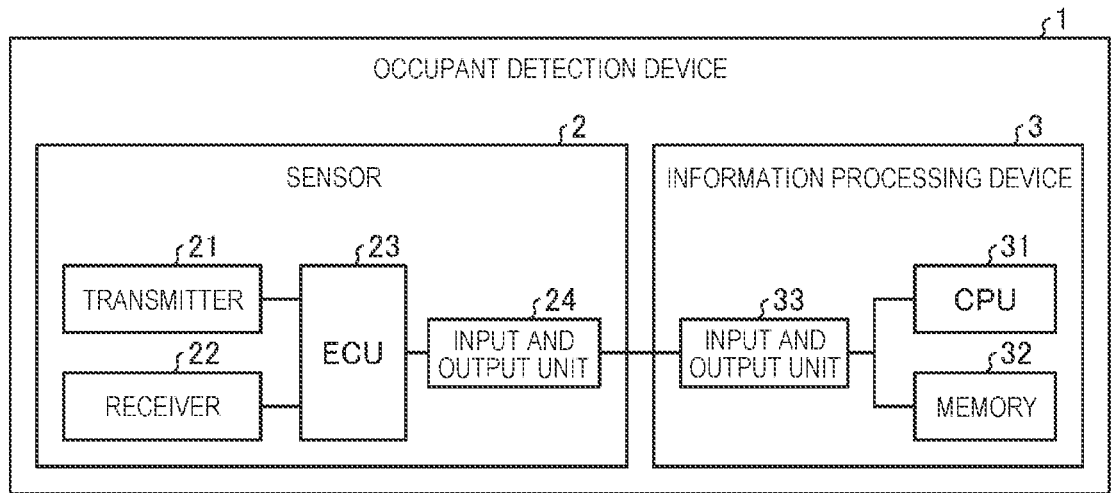
FIG. 2 is a block diagram showing an example of a hardware configuration of the occupant detection device according to the embodiment.

FIG. 2 is a block diagram showing an example of a hardware configuration of the occupant detection device 1 according to the embodiment. The sensor 2 includes a transmitter 21, a receiver 22, an electronic control unit (ECU) 23, and an input and output unit 24. The transmitter 21 is a device that transmits (emits) an electromagnetic wave with a predetermined frequency (for example, 60 GHz to 65 GHz) to the vehicle interior R as a transmission wave. The receiver 22 is a device that receives a reflected wave generated when the transmission wave is reflected by an object present in the vehicle interior R and generates an electrical signal indicating an intensity of the reflected wave. The transmitter 21 and the receiver 22 may be implemented using, for example, an oscillation circuit, a piezoelectric element, an AD converter, an amplifier, or a filter circuit. The transmitter 21 and the receiver 22 may be implemented separately or integrally. The ECU 23 is a microcontroller including a CPU, a memory, and the like, and executes processes related to control on the transmitter 21 and the receiver 22, generation of data based on the reflected wave received by the receiver 22, and the like. The input and output unit 24 is an interface device that establishes communication, which conforms to a predetermined standard such as CAN, with the information processing device 3 and other devices.

The information processing device 3 includes a central processing unit (CPU) 31, a memory 32, and an input and output unit 33. The CPU 31 executes various calculation processes according to programs stored in the memory 32. The memory 32 may include an appropriate volatile memory and an appropriate nonvolatile memory. The memory 32 stores programs for causing the CPU 31 to execute various processes for implementing functions of the occupant detection device 1, setting data, data acquired from the sensor 2, data generated by the CPU 31, and the like. The input and output unit 33 is an interface device that establishes communication, which conforms to a predetermined standard such as CAN, with the sensor 2 and other devices.

The hardware configuration shown in FIG. 2 is an example, and the hardware configuration of the occupant detection device 1 is not limited to the above example.

Figures 3, 4:
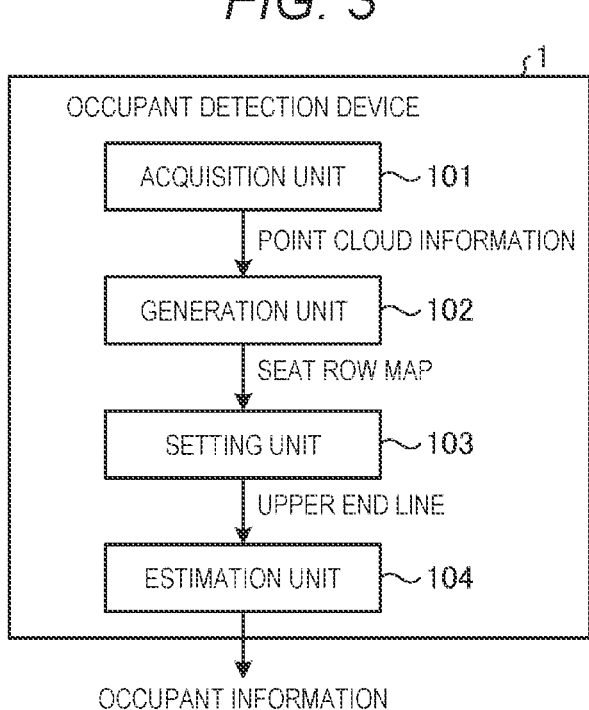
FIG. 3 is a block diagram showing an example of a functional configuration of the occupant detection device according to the embodiment.
FIG. 4 is a diagram showing an example of point cloud information according to the embodiment.

FIG. 3 is a block diagram showing an example of a functional configuration of the occupant detection device 1 according to the embodiment. The occupant detection device 1 according to the present embodiment includes an acquisition unit 101, a generation unit 102, a setting unit 103, and an estimation unit 104. The functional units 101 to 104 may be implemented by cooperation of, for example, hardware as shown in FIG. 2 and software (programs). A part or all of the functional units 101 to 104 may be implemented by dedicated hardware (circuits or the like) such as an application specific integrated circuit (ASIC) and a field-programmable gate array (FPGA).

The acquisition unit 101 acquires, based on the intensity of the reflected wave received by the sensor 2, point cloud information indicating a position of an object (moving object) moving in the vehicle interior R as a point cloud including a plurality of detection points on a three-dimensional map corresponding to a space in the vehicle interior R.

FIG. 4 is a diagram showing an example of point cloud information 201 according to the embodiment. The point cloud information 201 exemplified here is information obtained by plotting, as detection points P, a plurality of points (for example, voxels) corresponding to a position of a moving object (for example, a region occupied by a moving part of the body of an occupant 10) on the three-dimensional map (for example, a voxel map) corresponding to the space in the vehicle interior R. What kind of points (for example, voxels) will be the detection point P is determined based on preset conditions or the like relating to the reflected wave, and for example, the detection point P may be a point or the like at which an amount of change per unit time in the intensity of the reflected wave is larger than a predetermined threshold.

FIG. 4 shows a case in which three seating positions S21 to S23 are set on the second seat row SR2, two seating positions S31 and S32 are set on the third seat row SR3, and an occupant is seated at the seating position S23 on a right end of the second seat row SR2. In such a case, as shown in FIG. 4, a point cloud G including a plurality of detection points P corresponding to the body (for example, the head, the chest, the back, and the shoulder) of the occupant appears in a part of the three-dimensional map corresponding to a space above the seating position S23. The point cloud information 201 may include information on the point cloud G, for example, information indicating a position of each detection point P (plotting position), the number of detection points P in a predetermined region (plotting number), a plotting position, a time-series change in the plotting number, and the like.

The generation unit 102 (see FIG. 3) generates a seat row map for each of the seat rows SR2 and SR3 based on the point cloud information 201 acquired by the acquisition unit 101. The seat row map shows a distribution of the detection points P in a plane region corresponding to an arrangement direction (the Y direction in the present embodiment) of the plurality of seating positions S21 to S23, S31, and S32 and a height direction (the Z direction in the present embodiment) of the vehicle C. That is, in the present embodiment, a seat row map indicating a distribution of the detection points P in a plane region (Y-Z plane) corresponding to the second seat row SR2 and a seat row map indicating a distribution of the detection points P in a plane region corresponding to the third seat row SR3 are generated.

The setting unit 103 sets an upper end line along an upper end portion of a plane point cloud including a plurality of detection points P on a seat row map generated by the generation unit 102.

The estimation unit 104 estimates the number of occupants for each of the seat rows SR2 and SR3 based on a shape feature of the upper end line set by the setting unit 103. The estimation unit 104 estimates a seating position of the occupant for each of the seat rows SR2 and SR3 based on the shape feature of the upper end line. The estimation unit 104 estimates a physique of the occupant based on the shape feature of the upper end line. The estimation unit 104 generates occupant information indicating the estimated number of occupants, the estimated seating position, the estimated physique, and the like. The occupant information may be used in various applications, and may be used in, for example, a seat belt reminder function.

Figure 5:
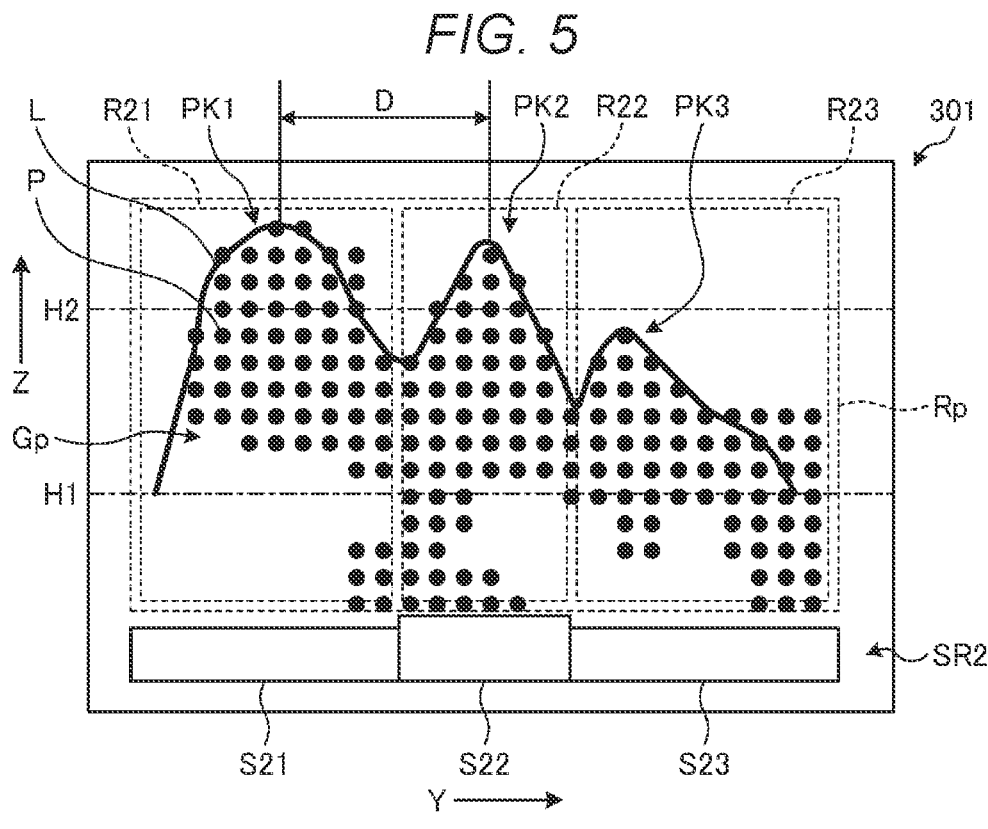
FIG. 5 is a diagram showing an example of a seat row map and an upper end line according to the embodiment.

FIG. 5 is a diagram showing an example of a seat row map 301 and an upper end line L according to the embodiment. The seat row map 301 shown in FIG. 5 shows a distribution of the detection points P in a plane region Rp (Y-Z plane) corresponding to the second seat row SR2. The plane region Rp includes three seating regions R21 to R23 respectively corresponding to the three seating positions S21 to S23 included in the second seat row SR2. A plane point cloud Gp is formed by a plurality of detection points P distributed in the plane region Rp. The plane point cloud Gp indicates a position of a moving object such as an occupant present on the second seat row SR2.

The upper end line L is set along an upper end portion of the plane point cloud Gp. The upper end line L can be set by performing an appropriate smoothing process on values (values indicating heights) of a plurality of detection points P located at the upper end of the plane point cloud Gp. The smoothing process is not particularly limited, and may be, for example, a process using an exponential moving average, a simple moving average, or the like.

Three peaks, which are peaks PK1, PK2, and PK3 each protruding upward (to a positive side in the height direction), appear on the upper end line L shown in FIG. 5. It can be estimated that each of the peaks PK1, PK2, and PK3 corresponds to an upper end portion of a moving object present in the vehicle interior R, that is, the head of an occupant. That is, it can be estimated, based on the upper end line L shown in FIG. 5, that three occupants are seated on the second seat row SR2. In this way, the number of occupants can be estimated for each of the seat rows SR2 and SR3 based on the number of peaks appearing on the upper end line L.

Seating positions of the occupants can be estimated based on the positions of the peaks PK1, PK2, and PK3 in the Y direction (the arrangement direction of the plurality of seating positions S21 to S23). The three peaks, which are peaks PK1, PK2, and PK3, on the upper end line L shown in FIG. 5 are located in the three seating regions R21 to R23, respectively, so that it can be estimated that the three occupants are seated at the regular seating positions S21 to S23, respectively. In this way, a seating position of an occupant can be estimated for each of the seat rows SR2 and SR3 based on a position of a peak appearing on the upper end line L.

In the present embodiment, establishment conditions of the peaks PK1, PK2, and PK3 include the fact that a peak interval D formed between two adjacent peaks is ensured to be equal to or larger than a predetermined distance (for example, 20 cm). Accordingly, the peaks PK1, PK2, and PK3 corresponding to the heads of the occupants can be detected with high accuracy. The upper end line L according to the present embodiment is set based on detection points P, which are present in a region above a first threshold H1 indicating a point higher than a seat surface by a predetermined distance, among the plurality of detection points P included in the plane point cloud Gp. The first threshold H1 is set such that a low region in which the head of a seated occupant is hardly present is removed from a detection range. Note that the first threshold H1 may be set based on the installation position of the sensor 2 (an inner surface of the ceiling 5) or the like. In this case, the first threshold H1 varies depending on a vehicle height (a distance from the seat surface to the ceiling 5) or the like, and may be set at, for example, a position about 60 cm away downward from the sensor 2. By setting the first threshold H1, erroneous detection due to an influence of a moving object other than the head of the occupant (for example, baggage placed on the seat surface) can be prevented.

Physiques of the occupants (for example, whether the occupant is an adult or a child) are estimated based on positions of the peaks PK1, PK2, and PK3 in the height direction and a second threshold H2 set at a position higher than the first threshold H1. In the example shown in FIG. 5, the peaks PK1 and PK2 are at positions higher than the second threshold H2, and the peak PK3 is at a position lower than the second threshold H2. In such a case, for example, it can be estimated that occupants corresponding to the peaks PK1 and PK2 are adults, and an occupant corresponding to the peak PK3 is a child. The second threshold H2 is appropriately set according to a physique to be estimated, and may be set based on, for example, a position of the head of a child having an average physique and seated in a child seat. Similar to the first threshold H1, the second threshold H2 may be set based on the installation position of the sensor 2 or the like. In this case, the second threshold H2 varies depending on the vehicle height or the like, and may be set at, for example, a position about 36 cm away downward from the sensor 2. By setting the second threshold H2, a physique of an occupant can be estimated.

Figure 6:
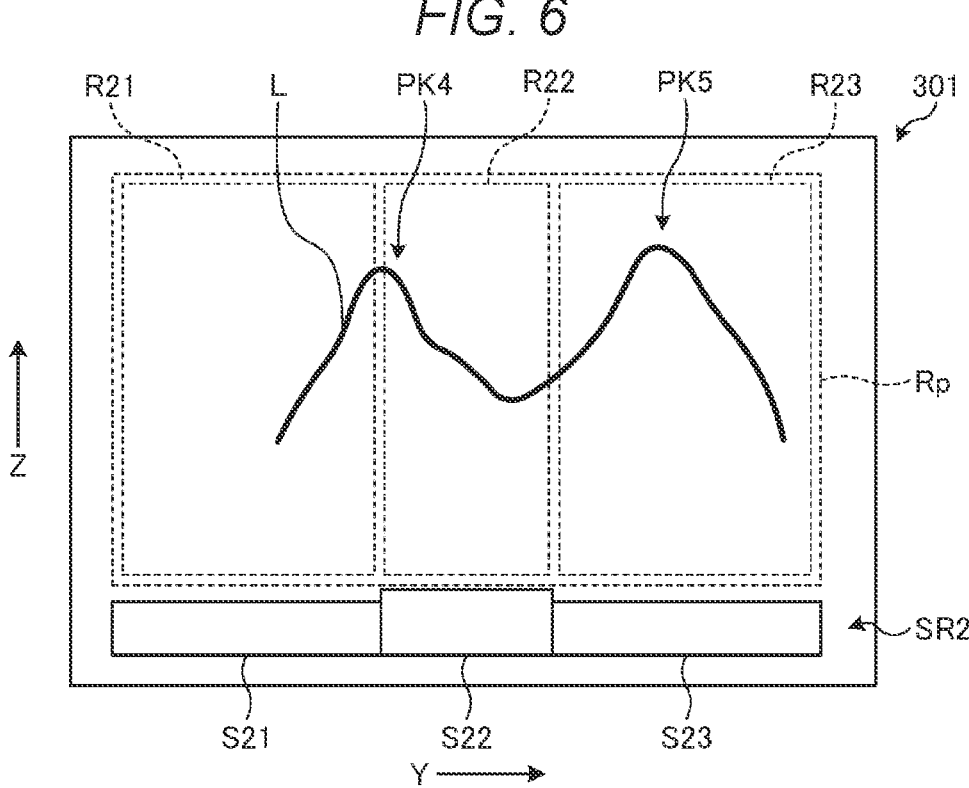
FIG. 6 is a diagram showing an example of an upper end line in a case in which an occupant is not seated at a regular seating position in the embodiment.

FIG. 6 is a diagram showing an example of the upper end line L in a case in which an occupant is not seated at a regular seating position in the embodiment. Two peaks, which are peaks PK4 and PK5, appear on the upper end line L shown in FIG. 6. One peak PK4 is located between the seating region R21 on a left end and the seating region R22 at a center, and the other peak PK5 is located in the seating region R23 on a right end. It can be estimated, based on the upper end line L, that two occupants are present on the second seat row SR2, that is, one occupant is seated between the seating position S21 on the left end and the seating position S22 at the center, and the other occupant is seated at the seating position S23 on the right end.

FIG. 7 is a flowchart showing an example of a process performed by the occupant detection device 1 according to the embodiment. When an occupant detection process is started, the acquisition unit 101 acquires the point cloud information 201 based on the intensity of the reflected wave received by the sensor 2 (S101). The generation unit 102 generates the seat row map 301 for each of the seat rows SR2 and SR3 based on the point cloud information 201 (S102). The setting unit 103 sets the upper end line L on each seat row map 301 (S103).

The estimation unit 104 estimates the number of occupants for each of the seat rows SR2 and SR3 based on the number of peaks (for example, the peaks PK1 to PK5 as described above) appearing in each upper end line L (S104), estimates a seating position of an occupant for each of the seat rows SR2 and SR3 based on a position of a peak (S105), and estimates a physique of an occupant based on a position of a peak in the height direction (S106). Thereafter, the estimation unit 104 generates occupant information indicating the estimated number of occupants, the estimated seating position, and the estimated physique of the occupant, and outputs the occupant information to a predetermined system, for example, a seat belt reminder (S107).

In the above embodiment, the occupant detection for the second seat row SR2 and the third seat row SR3 in the three-row seat vehicle has described, but the embodiment is not limited thereto. For example, a rear seat row in a two-row seat vehicle may be targeted, or the first seat row SR1 may be targeted.

As described above, according to the present embodiment, the number of occupants and the like are estimated for each of the seat rows SR2 and SR3 based on the shape feature of the upper end line L set on the seat row map 301 generated for each of the seat rows SR2 and SR3. Accordingly, an occupant can be detected with high accuracy regardless of a seating position of the occupant.

A program for causing a computer (the information processing device 3) to execute a process for implementing the functions of the occupant detection device 1 according to the embodiment described above may be stored in a computer-readable storage medium such as a CD-ROM, a CD-R, a memory card, a digital versatile disk (DVD), or a flexible disk (FD) in a file of an installable format or an executable format and may be provided as a computer program product. The program may be provided by being stored in a computer connected to a network such as the Internet and being downloaded via the network. The program may be provided or distributed via a network such as the Internet.

According to an aspect of this disclosure, an occupant detection device includes: an acquisition unit configured to acquire, based on an intensity of a reflected wave generated when a transmission wave transmitted toward an interior of a moving body is reflected by an object present in the interior, point cloud information indicating a three-dimensional-coordinate position of the object moving in the interior as a point cloud including a plurality of detection points; a generation unit configured to generate, based on the point cloud information, a seat row map for each seat row including a plurality of seating regions, the seat row map indicating a distribution of the detection points in a plane region corresponding to an arrangement direction of the plurality of seating regions and a height direction of the moving body; a setting unit configured to set, on the seat row map, an upper end line along an upper end portion of a plane point cloud including two or more of the detection points; and an estimation unit configured to estimate the number of occupants for each seat row based on a shape feature of the upper end line.

According to the above configuration, the number of occupants is estimated for each seat row based on the shape feature of the upper end line set on the seat row map generated for each seat row. Accordingly, an occupant can be detected with high accuracy regardless of a seating position of the occupant.

In the above configuration, the estimation unit may estimate the number of occupants based on the number of upward protruding peaks of the upper end line.

According to the above configuration, the number of occupants can be estimated with high accuracy based on the number of peaks each corresponding to the head of an occupant.

In the above configuration, the estimation unit may estimate a seating position of an occupant based on a position of the peak in the arrangement direction.

According to the above configuration, the seating position of the occupant can be estimated with high accuracy based on the position of the peak corresponding to the head of the occupant.

In the above configuration, the setting unit may set the upper end line based on the detection points among two or more of the detection points included in the plane point cloud which are present in a region above a first threshold higher than a seat surface by a predetermined distance.

According to the above configuration, erroneous detection due to an influence of a moving object (for example, baggage) other than the head of the occupant can be prevented, and detection accuracy can be improved.

In the above configuration, the estimation unit may estimate a physique of an occupant based on a position in a height direction of a corresponding upward protruding peak of the upper end line and a second threshold set above the first threshold.

According to the above configuration, the physique of the occupant can be estimated with high accuracy based on the position of the peak corresponding to the head of the occupant.

In the above configuration, the setting unit may set the upper end line by performing a smoothing process on values of two or more of the detection points which are located at the upper end portion of the plane point cloud.

According to the above configuration, a part other than the head can be prevented from appearing as a peak, and the detection accuracy can be improved.

According to another aspect of this disclosure, an occupant detection method includes: acquiring, based on an intensity of a reflected wave generated when a transmission wave transmitted toward an interior of a moving body is reflected by an object present in the interior, point cloud information indicating a three-dimensional-coordinate position of the object moving in the interior as a point cloud including a plurality of detection points; generating, based on the point cloud information, a seat row map for each seat row including a plurality of seating regions, the seat row map indicating a distribution of the detection points in a plane region corresponding to an arrangement direction of the plurality of seating regions and a height direction of the moving body; setting an upper end line along an upper end portion of a plane point cloud including a plurality of the detection points on the seat row map; and estimating the number of occupants for each seat row based on a shape feature of the upper end line.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An occupant detection device comprising:
a processor configured to
acquire, based on an intensity of a reflected wave generated when a transmission wave transmitted toward an interior of a moving body is reflected by an object present in the interior, point cloud information indicating a three-dimensional-coordinate position of the object moving in the interior as a point cloud including a plurality of detection points;
generate, based on the point cloud information, a seat row map for each seat row including a plurality of seating regions, the seat row map indicating a distribution of the detection points in a plane region corresponding to an arrangement direction of the plurality of seating regions and a height direction of the moving body;

set, on the seat row map, an upper end line along an upper end portion of a plane point cloud including two or more of the detection points; and estimate a number of occupants for each seat row based on a shape feature of the upper end line.

2. The occupant detection device according to claim 1, wherein the processor is configured to estimate the number of occupants based on a number of upward protruding peaks of the upper end line.

3. The occupant detection device according to claim 2, wherein the processor is configured to estimate a seating position of an occupant based on a position of the peak in the arrangement direction.

4. The occupant detection device according to claim 3, wherein the processor is configured to set the upper end line based on the detection points, among two or more of the detection points included in the plane point cloud, which are present in a region above a first threshold higher than a seat surface by a predetermined distance.

5. The occupant detection device according to claim 4, wherein the processor is configured to estimate a physique of the occupant based on a position in a height direction of the upward protruding peak of the upper end line and a second threshold set above the first threshold.

6. The occupant detection device according to claim 3, wherein the processor is configured to set the upper end line by performing a smoothing process on values of two or more of the detection points which are located at the upper end portion of the plane point cloud.

7. The occupant detection device according to claim 1, wherein the processor is configured to set the upper end line based on the detection points, among two or more of the detection points included in the plane point cloud, which are present in a region above a first threshold higher than a seat surface by a predetermined distance.

8. The occupant detection device according to claim 7, wherein the processor is configured to estimate a physique of an occupant based on a position in a height direction of an upward protruding peak of the upper end line and a second threshold set above the first threshold.

9. The occupant detection device according to claim 1, wherein the processor is configured to set the upper end line by performing a smoothing process on values of two or more of the detection points which are located at the upper end portion of the plane point cloud.

10. The occupant detection device according to claim 2, wherein the processor is configured to set the upper end line based on the detection points, among two or more of the detection points included in the plane point cloud, which are present in a region above a first threshold higher than a seat surface by a predetermined distance.

11. The occupant detection device according to claim 10, wherein the processor is configured to estimate a physique of an occupant based on a position in a height direction of the upward protruding peak of the upper end line and a second threshold set above the first threshold.

12. The occupant detection device according to claim 2, wherein the processor is configured to set the upper end line by performing a smoothing process on values of two or more of the detection points which are located at the upper end portion of the plane point cloud.

13. An occupant detection method comprising:

acquiring, based on an intensity of a reflected wave generated when a transmission wave transmitted toward an interior of a moving body is reflected by an object present in the interior, point cloud information indicating a three-dimensional-coordinate position of the object moving in the interior as a point cloud including a plurality of detection points;

generating, based on the point cloud information, a seat row map for each seat row including a plurality of seating regions, the seat row map indicating a distribution of the detection points in a plane region corresponding to an arrangement direction of the plurality of seating regions and a height direction of the moving body;

setting an upper end line along an upper end portion of a plane point cloud including two or more of the detection points on the seat row map; and estimating a number of occupants for each seat row based on a shape feature of the upper end line.

* * * * *